United States Patent Office 2,805,637
Patented Sept. 10, 1957

2,805,637

INSTRUMENT VISUAL INDICATING MEANS

Edwin I. Dillon, Van Nuys, Calif., assignor to W. C. Dillon & Company, Inc., a corporation of California Application August 10, 1955, Serial No. 527,495

1 Claim. (Cl. 116—129)

This invention relates generally to a visual indicating means for use in conjunction with an instrument having a pointer and scale type construction, and more particularly to instruments of this type in which the pointer is sensitive to minute changes in driving torque.

The indicator means of the present invention will be described with reference to a dial type thermometer; however, it will be appreciated that the indicator means is equally adaptable to other types of instruments where there is relative movement between the scale and the pointer, regardless of whether the actual movement occurs in the pointer or in the scale.

Dial type thermometers and other similar indicating instruments usually include a pointer driven by a shaft to give a scale rating of a particular physical condition. In most instrument structures of this type, precise constructions are used so that the pointer and shaft movement directly respond to and reflect the change in physical condition. In consequence, the accuracy of the instrument is seriously affected by the introduction of any additional element which may increase the inertia of the pointer or its retarding friction.

It has, therefore, been a problem to incorporate a structure in the instrument enabling an operator to know when the pointer has drifted from a desired or given position. For example, in order for an operator to determine whether or not a particular process is operating at a safe temperature, he must approach the thermometer and ascertain the particular scale rating. In cases where a critical or safe temperature must be maintained over an appreciable length of time, this procedure is awkard and time consuming.

It is, therefore, an object of the present invention to provide an indicator means for an instrument which will enable an operator at a distance from the instrument, to ascertain whether or not the instrument pointer has drifted from a critical or safe scale reading.

Another object is to provide an indicator means which will not, when embodied in the instrument, appreciably affect the inherent accuracy of the instrument.

Another object of the present invention is to provide an indicating means of a simple construction which may be incorporated into an instrument without significant modification or changes in the instrument design.

A still further object of the present invention is to provide an indicator means which may be readily altered and adjusted to conform with a particular instrument design as well as to meet a particular instrumentation problem.

Briefly, these and other objects of the present invention are attained by providing a visual indicator means for an instrument, comprising two marking members mounted in different predetermined positions on the viewing portion or face of the instrument. A first marking member has a particular area and shape and is secured to the instrument in a position, stationary with respect to the scale. A second marking member is similarly secured to the instrument and also has a particular area and shape; it is, however, disposed in a second position stationary with respect to the pointer of the instrument. The first position and second position, above referred to, are so established that when the pointer is disposed at the given critical or safe scale reading, one of the marking members is partially or completely eclipsed by the other.

It will, thus, be apparent that if the particular marking member adapted to be eclipsed is given an identifying warning color and has a substantial area, an operator at some distance from the instrument will be able to determine when the pointer has drifted from the safe or critical scale reading by a mere glance at the face of the instrument to ascertain if the marking member having the colored warning indication is visible. If it is visible, he may then make the necessary adjustments and changes in the process, for example, in order to re-establish the desired temperature operating range. If it is not visible, he is assured that no adjustments or changes are required, and he need not approach the instrument to find out what the particular scale reading is.

A better understanding of the present invention will be had by reference to the drawings, illustrating a preferred embodiment, in which.

Figure 1:
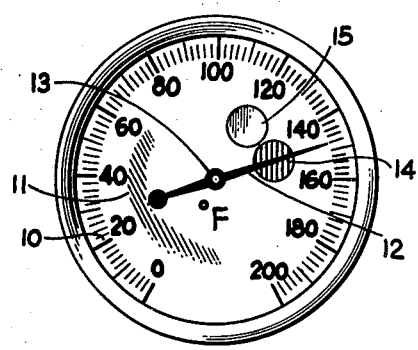
Figure 1 is a front view of a typical thermometer type instrument embodying the visual indicating means of the present invention.

There is shown in Figure 1 the viewing portion of a typical dial thermometer comprising generally a dial 10 covered by a glass 11. The dial 10 has affixed to its surface a typical scale with temperature readings.

Interposed between the dial 10 and the glass 11 is a pointer 12 adapted to rotate about the axis 13 of a suitable driving shaft.

In accordance with a primary feature of the present invention, a first marking member in the form of a disc 14 is located in the plane of the pointer at a given radial distance from the axis 13. The disc 14 serves as a warning element, and for this purpose is preferably painted red or otherwise marked with a distinctive coloring. The disc 14 may either be integrally formed with or attached to the pointer 12. It is, however, preferably of a light construction and of sufficiently small dimensions to avoid any significant interference with the natural movement of the pointer.

There is additionally provided a second marking member, of equal cross section, in the form of a masking disc 15 on the glass 11. Masking disc 15 is disposed at the same radial distance from the axis 13 as the warning disc 14. The disc 15 is formed of an opaque substance and preferably colored to blend with the dial 10. The disc 15 may be either affixed to the outer surface or inner surface of the glass, or it may be formed integrally with the glass, for example, as a frosted element. It is positioned on the glass at the particular angular line corresponding with the critical or safe scale reading desired. For example, a scale reading of 120° F. has been illustratively used in the drawings.

Figure 2:
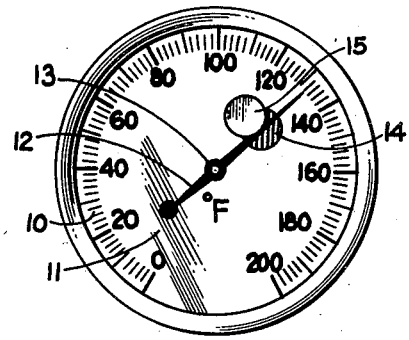
Figure 2 is a view similar to Figure 1 in which the indicator means is partially eclipsed; and, Figure 3 is a front view of a typical dial type thermometer, illustrating a modified form of the visual indicator means of the present invention.

The co-operative functioning and interrelation of the warning disc 14 and the masking disc 15 is more clearly shown in the view of Figure 2. In this view, the pointer 13 is shown in a position more closely approaching the desired critical scale reading. As such, the warning disc 14 is partially obscured or eclipsed by the disc 15 so that only a crescent shaped area of the disc 14 may be viewed by the operator. It will be evident, that as the pointer approaches the desired 120° F. temperature, the masking disc 15 will completely eclipse the warning disc 14 because of their superposed positions and their congruous areas.

Thus, in operation, an operator is able to glance at the thermometer from some distance and determine whether or not a safe operating temperature is being maintained. For example, in the view of Figure 2, it will be noted that the fringe portion of the warning disc 14 visible is an indication that the pointer is slightly off the desired operating temperature. When the disc 14 is completely visible, as in the view of Figure 1, the operator will be able to see a bright red dot, for example, characterizing the warning disc 14. He may then take the necessary steps to make proper adjustments and changes in the controls.

Figure 3:
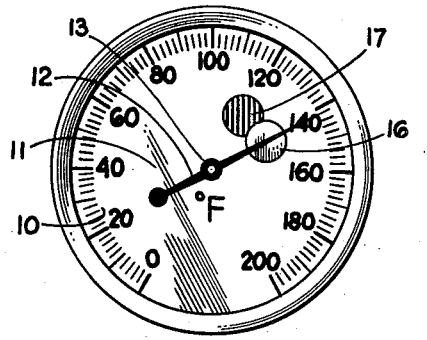

In Figure 3, the marking members are disposed on different portions of the viewing surface of the instrument from those shown in Figures 1 and 2, although their relative positioning is equivalent. In this view, a masking disc 16 is embodied in the pointer 13, and a warning disc 17 is formed on the face of the dial 10. It will be seen, however, that the masking disc is still spaced forwardly of the warning disc, although the masking disc 16 is now the movable marking member, whereas the warning disc 14 was the movable member in the views of Figure 1 and Figure 2.

The operation of the indicator means shown in Figure 3 is similar to that shown in Figure 2. As the pointer 13 moves counter clockwise, and stabilizes at a scale rating of 120° F., the masking disc 16 will be superposed over and eclipse the warning disc 17. As with the constructions of Figure 1 and Figure 2, any drifting of the pointer 12 from the desired scale reading of 120° will result in a portion of the disc 17 being exposed to view, thereby enabling the operator to realize from a distance that the desired scale reading is not being maintained.

It is evident that the present invention may be readily incorporated in an instrument as a simple and convenient means of providing a warning indication without substantially modifying the instrument and without detracting from its accuracy. It will also be seen that the indicator means of the present invention has extreme versatility from the operator's viewpoint. For example, to change the critical reading, as in the view of Figure 1, the operator need only reposition the masking disc 15 or loosen and reposition the glass 11.

The visual indicator means of the present invention may be subjected to various changes and modifications without departing from the spirit and scope of the invention. For example, although the two marking members have been shown as being of equal and congruous areas, by forming the masking member 15, in Figure 1, for example, as an elongated oval member, the warning disc 14 will be obscured from visibility over a predetermined range of temperatures rather than a precise temperature scale reading. It is apparent that while the circular shape illustrated for the marking members has certain advantages, other non-circular shapes, for example, triangular, rectangular, or square, may be used.

What is claimed is:

In a thermometer instrument including a scale structure, a glass positioned forward of said scale structure, and a pointer interposed between said scale structure and said glass; a visual means on said instrument for indicating a given position of said pointer with respect to said scale structure comprising: an opaque first marking member having a defined area retained by said glass in a first position at a given radial distance from the axis of said pointer; a second marking member retained by said pointer in a second position, said second marking member also being disposed at said given radial distance from the axis of said pointer and having a defined area congruous with the defined area of said first marking member, whereby at said given position of the pointer, said second marking member is completely eclipsed by said first marking member; and, means for varying the angular location of said first marking member to in turn vary said first position on a circular arc defined by said given radius.

References Cited in the file of this patent

UNITED STATES PATENTS

| | | |
|---|---|---|
| 531,669 | Weston | Jan. 1, 1895 |
| 1,743,401 | Schlaich | Jan. 14, 1930 |
| 2,009,209 | Scantlebury | July 23, 1935 |
| 2,124,089 | Stuerzl | July 19, 1938 |
| 2,278,520 | Klein | Apr. 7, 1942 |